United States Patent
Choi et al.

(10) Patent No.: US 7,217,763 B2
(45) Date of Patent: May 15, 2007

(54) ACRYLONITRILE-BUTADIENE-STYRENE COPOLYMER TRANSPARENT RESIN HAVING SUPERIOR CHEMICAL RESISTANCE AND TRANSPARENCY AND PREPARATION THEREOF

(75) Inventors: Jeong-Su Choi, Suncheon (KR); Sung-Hee Kim, Gwangju (KR); Hyoung-Min Bahn, Yeosu (KR); Keun-Hoon Yoo, Daejeon (KR)

(73) Assignee: LG Chem, Ltd. (KR)

( * ) Notice: Subject to any disclaimer, the term of this patent is extended or adjusted under 35 U.S.C. 154(b) by 190 days.

(21) Appl. No.: 10/494,228

(22) PCT Filed: Oct. 24, 2002

(86) PCT No.: PCT/KR02/01985
§ 371 (c)(1),
(2), (4) Date: Sep. 22, 2004

(87) PCT Pub. No.: WO03/037977
PCT Pub. Date: May 8, 2003

(65) Prior Publication Data
US 2005/0032984 A1    Feb. 10, 2005

(30) Foreign Application Priority Data
Oct. 29, 2001    (KR)    ............... 10-2001-0066856

(51) Int. Cl.
*C08L 51/08*    (2006.01)
*C08L 55/02*    (2006.01)

(52) U.S. Cl. .............. 525/69; 525/83; 525/84; 525/77; 525/78; 525/92 B; 525/85

(58) Field of Classification Search .............. 525/69, 525/83, 84, 77, 78, 92 B, 85
See application file for complete search history.

(56) References Cited

U.S. PATENT DOCUMENTS

| | | | |
|---|---|---|---|
| 2,806,822 A | * 9/1957 | Ott | .......... 521/139 |
| 3,919,157 A | * 11/1975 | Ide et al. | .......... 524/269 |
| 4,767,833 A | 8/1988 | Yumoto et al. | .......... 525/193 |
| 5,166,261 A | 11/1992 | Wu et al. | .......... 525/53 |
| 5,470,906 A | * 11/1995 | Craun et al. | .......... 524/507 |
| 5,969,042 A | 10/1999 | Tiefensee et al. | .......... 525/83 |
| 6,354,965 B1 | * 3/2002 | Harris et al. | .......... 473/354 |

FOREIGN PATENT DOCUMENTS

| | | |
|---|---|---|
| EP | 0 703 252 A2 | 3/1996 |
| GB | 2 092 604 A | 8/1982 |
| JP | 07331064 | * 12/1995 |
| JP | 8-199008 | 8/1996 |
| JP | 11-147020 | 6/1999 |
| KR | 1998-0045699 | 5/1999 |

OTHER PUBLICATIONS

PCT International Search Report; International application No. PCT/KR02/01985; International filing date: Oct. 24, 2002; Date of Mailing: Sep. 12, 2003.
PCT International Preliminary Examination Report; International application No. PCT/KR2002/001985, International filing date: Oct. 24, 2002; Date of Completion: Mar. 10, 2004.

* cited by examiner

*Primary Examiner*—James J. Seidleck
*Assistant Examiner*—Olga Asinovsky
(74) *Attorney, Agent, or Firm*—Cantor Colburn LLP

(57) ABSTRACT

The present invention relates to acrylonitrile-butadiene-styrene copolymer transparent resin having superior chemical resistance and transparency and preparation thereof, and particularly to acrylonitrile-butadiene-styrene copolymer transparent resin having superior chemical resistance and transparency by graft-copolymerzing on a) conjugated diene rubber latex, b) methacrylate alkylester or acrylate alkylester compound, c) aromatic vinyl compound and d) vinyl cyanide compound, and preparation thereof. In addition, according to the present invention, chemical resistance and ESCR can be further improved by further adding e) polyester-amide copolymer to the acrylonitrile-butadiene-styrene copolymer transparent resin.

7 Claims, No Drawings

ACRYLONITRILE-BUTADIENE-STYRENE COPOLYMER TRANSPARENT RESIN HAVING SUPERIOR CHEMICAL RESISTANCE AND TRANSPARENCY AND PREPARATION THEREOF

BACKGROUND OF THE INVENTION (a) Field of the Invention

The present invention relates to acrylonitrile-butadiene-styrene copolymer transparent resin having improved chemical resistance by graft-copolymerizing methacrylate alkyl ester or acrylate alkylester compound, aromatic vinyl compound and vinylcyanide compound on conjugated diene rubber latex, and preparation thereof, and acrylonitrile-butadiene-styrene copolymer transparent resin having more improved chemical resistance and ESCR(Environmental stress cracking resistance) by further comprising polyester-amide copolymer, and preparation thereof.

(b) Description of the Related Art

Recently, as industries become advanced and products become differentiated, studies for development of transparent material in order to introduce nude fashion culture and pastel tone color culture in products to achieve design revolution are actively under progress.

Generally used transparent resin includes polycarbonate (PC) resin, polymethylmethacrylate (PMMA) resin, polystyrene (PS) resin, polyacrylonitrile-styrene (SAN) resin, etc. Polycarbonate resin has superior impact strength and transparency, but it has inferior processibility and thus is difficult to be made into complicated product, and it also has inferior chemical resistance. Polymethylmethacrylate resin is widely used as optical material because of its superior optical properties, but it has very poor impact resistance and chemical resistance. And, polystyrene resin and polyacrylonitrile-styrene resin also have very poor chemical resistance and impact resistance.

Acrylonitrile-butadiene-styrene (herein after referred to as 'ABS') terpolymer has balanced properties of impact strength and fluidity, etc., and thus it is variously used for automobile goods, household electric appliances, OA supplies, etc.

U.S. Pat. No. 4,767,833, Japanese Laid-open Patent Publication Hei 11-147020, EP 703,252 and Japanese Laid-open Patent Publication Hei 8-199008 have disclosed a method for giving transparency by introducing acrylate alkylester or methacrylate alkylester compound in acrylonitrile-butadiene-styrene (abs) resin having superior impact resistance, chemical resistance, processibility, etc. However, the method has problems in that chemical resistance is inferior due to methacrylate alkylester introduced for giving transparency. Therefore, the resin cannot be applied for a processed goods requiring chemical resistance such as container for spray or cosmetics, battery case, etc. U.S. Pat. No. 5,969,042 and Korean Patent Application No. 1998-045699 have mentioned chemical resistance of transparent ABS resin, but U.S. Pat. No. 5,969,042 has problems of inferior transparency and Korean Patent Application No. 1998-045699 has problems in that cracks easily occur when used for container for cosmetics, battery case, etc., and chemical resistance is unsatisfactory.

Accordingly, there is a need for acrylate-butadiene-styrene resin simultaneously having superior transparency and chemical resistance.

SUMMARY OF THE INVENTION

In order to solve these problems, it is an object of the present invention to provide acrylonitrile-butadiene-styrene copolymer transparent resin having balanced physical properties of impact resistance, processibility, etc., and simultaneously having superior chemical resistance and transparency.

It is another object of the present invention to provide a method for preparing acrylonitrile-butadiene-styrene copolymer transparent resin having remarkably improved chemical resistance and ESCR.

In order to achieve these objects, the present invention provides acrylonitrile-butadiene-styrene copolymer transparent resin comprising:

a) 15 to 40 weight parts of conjugated diene rubber latex;

b) 20 to 65 weight parts of methacrylate alkyl ester or acrylate alkylester compound grafted on the a) conjugated diene rubber latex;

c) 8 to 25 weight parts of aromatic vinyl compound grafted on the a) conjugated diene rubber latex; and d) 5 to 20 weight parts of vinylcyanide compound grafted on the a) conjugated diene rubber latex.

The present invention also provides acrylonitrile-butadiene-styrene copolymer transparent resin further comprising e) 1 to 30 weight parts of polyester-amide copolymer on the basis of 100 weight parts of the acrylonitrile-butadiene-styrene transparent resin, having superior chemical resistance and transparency.

The present invention also provides a method for preparing acrylonitrile-butadiene-styrene copolymer transparent resin comprising the step of batch charge or incremental charge a) to 15 to 40 weight parts of conjugated rubber latex, b) 20 to 65 weight parts of methacrylate alkylester compound or acrylate alkylester compound;

c) 8 to 25 weight parts of aromatic vinyl compound; and d) 5 to 20 weight parts of vinylcyanide compound to graft-copolymerize them.

The present invention also provides a method for preparing acrylonitrile-butadiene-styrene copolymer transparent resin further comprising the step of adding polyester-amide copolymer to the acrylonitrile-butadiene-styrene copolymer and blending them.

DETAILED DESCRIPTION AND THE PREFERRED EMBODIMENTS

The present invention will now be explained in detail.

The present inventors have studied a method for giving chemical resistance and ESCR to acrylonitrile-butadiene-styrene resin, and the present invention is based on the discovery that when graft-copolymerizing methacrylate alkylester or acrylate alkylester compound, aromatic vinyl compound and vinylcyanide compound on conjugated diene rubber latex with controlling refractive indexes and molecular weights thereof, the product has superior chemical resistance.

The present invention relates to acrylonitrile-butadiene-styrene copolymer transparent resin prepared by graft-copolymerizing methacrylate alkylester or acrylate alkylester compound, aromatic vinyl compound and vinyl cyanide compound on conjugated diene rubber latex with controlling refractive indexes and molecular weights thereof, acrylonitrile-butadiene-styrene copolymer transparent resin further comprising polyester-amide copolymer to further improve chemical resistance and ESCR.

As the conjugated rubber latex, general butadiene rubber latex or styrene-butadiene copolymer rubber latex can be used, and preferably those having particle diameter of 800 to 4,000 Å, gel contents of 60 to 95% and swelling index of 12 to 40 are used. And, the conjugated diene rubber latex is contained in an amount of 15 to 40 weight parts (on the basis of solid contents), and preferably in an amount of 20 to 30 weight parts. If the contents are less than 15 weight parts, chemical resistance is inferior, and if more than 40 weight parts, rigidity is inferior and grafting does not completely occur in polymerization and thus mechanical properties are very poor.

As the methacrylate alkylester or acrylate alkylester compound, methacrylate methylester, methacrylate ethylester, methacrylate propylester, methacrylate 2-ethylhexylester, methacrylate decylester or methacrylate laurylester, etc. can be used, and methylmethacrylate is preferable. And the methacrylate alkylester compound or acrylate alkylester compound is preferably contained in an amount of 20 to 65 weight parts.

As the aromatic vinyl compound, styrene, α-methylstyrene, p-methylstyrene or vinyltoluene, etc. can be used, and styrene is preferable. And, the aromatic vinyl compound is preferably contained in an amount of 8 to 25 weight parts.

As the vinylcyanide compound, acrylonitrile or methacrylonitrile can be used, and the contents are preferably 5 to 20 weight parts. If the contents are less than 5 weight parts, chemical resistance is inferior, and if more than 20 weight parts, the color of resin changes into yellow and thus cannot satisfy wants of consumers requiring natural color, and solid contents (coagulum) are largely produced and thus is difficult to produce.

Transparency of the acrylonitrile-butadiene-styrene copolymer transparent resin of the present invention is absolutely influenced by refractive index of a mixture of used monomers, the refractive index is controlled by mixing ratio of monomers. Specifically, the refractive index of the conjugated diene rubber latex should be controlled to be similar to the refractive index of remaining ingredients, and thus the mixing ratio of monomers is very important. In addition, the contents and molecular weight of used vinyl cyanide compound are controlled to give chemical resistance to the final product.

Refractive index of a mixture of used monomers absolutely influences on transparency and the refractive index is controlled by contents and mixing ratio of monomers. Specifically, in order to give transparency, the refractive index of conjugated diene compound used as a seed for grafting and that of grafted ingredients should be similar to each other, and suitably, the refractive index of the conjugated diene compound is identical to that of grafted ingredients. Preferably, the difference between refractive index of the conjugated diene rubber latex and that of grafted compounds is less than 0.005. Specifically, if the conjugated diene is polybutadiene, the refractive index of the rubber latex is approximately 1.516 and the refractive index of grafted compounds should be similar to it, and it is not suitable if the refractive index of grated compounds is below 1.551 or over 1.521. The refractive index of butadiene is 1.516, that of methylmethacrylate is approximately 1.49, that of styrene is 1.59, and that of acrylonitrile is 1.518, and the refractive index of grafted polymer can be calculated as follows:

$$\text{Refractive index of graft polymer} = Wt_A \times RI_A + Wt_S \times RI_S + Wt_M \times RI_M$$

$Wt_A$=wt % of vinyl cyanide compound $RI_A$=refractive index of vinyl cyanide compound (1.52)

$Wt_s$=wt % of aromatic vinyl compound $RI_s$=refractive index of aromatic vinyl compound (1.592)

$Wt_M$=wt % of methacrylate alkylester or acrylate alkylester $RI_M$=refractive index of methacrylate alkylester or acrylate alkylester compound (1.49)

The acrylonitrile-butadiene-styrene copolymer transparent resin may further comprise mercaptan as molecular weight controlling agent, and for examples, tert-dodecylmercaptan or n-dodecylmercaptan can be used, and particularly tert-dodecylmercaptan is preferable.

The acrylonitrile-butadiene-styrene copolymer transparent resin is polymerized by emulsion polymerization. Weight average molecular weight of graft-polymerized final resin is preferably 60,000 to 250,000, and if it is less than 60,000, chemical resistance is inferior, and if more than 250,000, processing properties of resin is inferior.

In addition, to 100 weight parts of the acrylonitrile-butadiene-styrene copolymer transparent resin prepared by graft-copolymerizing methacrylate alkylester or acrylate alkylester compound, aromatic vinyl compound and vinylcyan compound on conjugated diene rubber latex with controlling refractive indexes and molecular weights thereof, 1 to 30 weight parts of polyester-amide copolymer can be added and blended to further improve chemical resistance and ESCR. And, oxidation-stabilizer, UV-stabilizer, lubricants, etc. can be further added.

The polyester-amide copolymer is block or graft copolymer obtained by reaction of ester and amide, and preferably has refractive index difference of 0.01 or less between acrylonitrile-butadiene-styrene copolymer transparent resin. If the difference exceeds 0.01, transparency drops. And, the contents of the polyester-amide copolymer are preferably 1 to 30 weight parts, and more preferably 1 to 10 weight parts. If the contents are less than 1 weight parts, chemical resistance-improving effects are little, and if more than 30 weight parts, mechanical strength and transparency drop and material cost is high and thus uneconomical.

The present invention will be explained in more detail with reference to the following Examples. However, these are to illustrate the present invention and the present invention is not limited to them.

EXAMPLE

Example 1

Preparation of acrylonitrile-butadiene-styrene Copolymer Transparent Resin

In 25 weight parts of rubber latex prepared by emulsion polymerization with gel contents of 70% and average particle diameter of 0.3 μm, 150 weight parts of ion-exchange water, 0.5 weight parts of sodium oleate as an emulsifier, 49.74 weight parts of methylmethacrylate as methacrylate alkylester compound, 17.25 weigh parts of styrene as aromatic vinyl compound, 8 weight parts of acrylonitrile as vinylcyanide compound, 0.5 weight parts of tert-dodecylmercaptan as molecular weight controlling agent, 0.096 weight parts of sodium pyrophosphate, 0.024 weight parts of dextrose, 0.002 weight parts of ferrous sulfide and 0.08 weight parts of cumene hydroperoxide were continuously introduced to react them. After reaction, temperature was elevated to 80° C. and the reactant was aged for 1 hour to terminate a reaction. Polymerization conversion rate was 99%, and solidification contents were 0.3%. And, the prepared latex was solidified with calcium chloride aqueous solution and washed to obtain powder.

Examples 2 and Comparative Examples 1–5

Preparation of acrylonitrile-butadiene-styrene Copolymer Transparent Resin

Acrylonitrile-butadiene-styrene copolymer transparent resin was prepared by the same method as in Example 1, except changing the amounts of rubber latex, acrylonitrile, styrene, methylmethacrylate or tert-dodecylmercaptan as shown in Table 1.

Haze value and weight average molecular weight of the acrylonitrile-butadiene-styrene copolymer transparent resin prepared in Examples 1 or 2, and Comparative Examples 1 to 5 were measured and the results were presented in Table 1.

a) Haze value: measured by ASTM 1003 method, and as the value is smaller, resin is more transparent.
b) Weight average molecular weight: measured using GPC, and calibrated using PMMA standard, and then molecular weight of modifier was measured.

Examples 1 to 5 were mixed with polyester-amide compound (SANYO Chemical, Pellestat-6321, Pellestat-7530) with the compositions and contents as shown in Table 2, and 0.1 weight parts of lubricant and 0.2 weight parts of antioxidant were introduced therein. The reactant was prepared

TABLE 1

|  | Example | | Comparative Example | | | | |
|---|---|---|---|---|---|---|---|
|  | 1 | 2 | 1 | 2 | 3 | 4 | 5 |
| polybutadiene | 25 | 20 | 25 | 25 | 25 | 25 | 10 |
| Methylmethacrylate | 49.74 | 54.16 | 48.34 | 54.06 | 37.5 | 28.5 | 61.56 |
| Styrene | 17.26 | 18.84 | 18.76 | 18.94 | 12.5 | 21.5 | 21.44 |
| Acrylonitrile | 8 | 7 | 8 | 2 | 25 | 8 | 7 |
| Tert-dodecylmercaptan | 0.5 | 0.5 | 0.8 | 0.5 | 0.5 | 0.5 | 0.5 |
| Haze value | 1.9 | 1.8 | 2 | 1.8 | — | 25 | 2.1 |
| Weight average molecular weight | 140,000 | 130,000 | 40,000 | 140,000 | — | 140,000 | 80,000 |
| Others | — | — | — | — | Stability Drop | Transparency drop | — |

As shown in Table 1, the resin of Examples 1 and 2 according to the present invention comprising 15 to 40 weight parts of conjugated rubber latex, 20 to 65 weight parts of methacrylate alkylester, 8 to 25 weight parts of aromatic vinyl compound and 5 to 20 weight parts of vinyl cyanide compound have superior haze value and weight average molecular weight compared to those of Comparative Examples 1 to 5, and do not show stability problem or transparency drop problem.

Examples 3 to 5 and Comparative Examples 6 to 10

Blending with Polyester-amide Compound

The acrylonitrile-butadiene-styrene copolymer transparent resin prepared in Example 1 or 2 and Comparative Examples 1 to 5 were mixed with polyester-amide compound in the form of pellet at a cylinder temperature of 220° C. using 2-shaft extruder. It was injection molded into a pellet to prepare a sample, and haze value and chemical resistance for soybean oil, 10% sulfuric acid, 70% acetic acid and isopropyl alcohol (IPA) were measured and the results were shown in Table 2.

c) Chemical resistance—Test sample for tensile strength was placed on a jig with 1.5% strain, and dampened with soybean oil, 10% sulfuric acid, 70% acetic acid and isopropyl alcohol and stood for 2 days, and after 2 days, change of the sample was observed to evaluate as follows:

OK: No change in the sample

C: Cracks occurred

B (time): Time when the sample was broken

TABLE 2

|  |  |  | Example | | | Comparative Example | | | | |
|---|---|---|---|---|---|---|---|---|---|---|
|  |  |  | 3 | 4 | 5 | 6 | 7 | 8 | 9 | 10 |
| ABS Transparent Resin | Example | 1 | 100 | 95 | — | — | — | — | — | — |
|  |  | 2 | — | — | 90 | 90 | — | — | — | — |
|  | Comparative | 1 | — | — | — | — | 100 | — | — | — |
|  |  | 2 | — | — | — | — | — | 90 | — | — |
|  | Example | 4 | — | — | — | — | — | — | 100 | — |
|  |  | 5 | — | — | — | — | — | — | — | 95 |
| Polyamide | P-6321 |  | — | 5 | 10 | — | — | 10 | — | 5 |
|  | P-7530 |  | — | — | — | 10 | — | — | — | — |
|  | Haze value |  | 2.1 | 3.4 | 4.5 | 15 | 2 | 4.8 | 25 | 5.1 |
| Chemical Resistance | Soybean oil |  | OK | OK | OK | OK | B (4 hr.) | OK | OK | C |
|  | 10% sulfuric acid |  | OK | OK | OK | OK | C | C | OK | C |
|  | 70% acetic acid |  | C | OK | C | C | B (30 min) | B (4 hr.) | C | B (4 hr.) |
|  | IPA |  | B (2 hr.) | C | B (4 hr.) | B (3 hr.) | B (1 min) | B (20 min) | B (3 hr.) | B (10 min) |

P-6321: pellestat-6321, SANYO, R.I. = 1.51
P-7530: pellestat-7530, SANYO, R.I. = 1.53

As shown in Table 2, the acrylonitrile-butadiene-styrene copolymer transparent resin comprising 15 to 50 weight parts of conjugated diene rubber latex, 20 to 65 weight parts of methacrylate alkylester compound, 8 to 25 weight parts of aromatic vinyl compound and 5 to 20 weight parts of vinyl cyanide compound, and resin prepared by blending polyester-amide compound (P-6321) with refractive index difference of less than 0.01 with the above resin have superior haze value and chemical resistance compared to those of Comparative Examples 6 to 10.

As explained, according to the present invention, the acrylonitrile-butadiene-styrene copolymer transparent resin has balanced physical properties of impact resistance, processibility, etc., and remarkably improved chemical resistance and transparency, and chemical resistance and ESCR can be further improved by blending polyester-amide copolymer thereto.

What is claimed is:

1. Acrylonitrile-butadiene-styrene copolymer transparent resin comprising
   i) 100 weight parts of acrylonitrile-butadiene-styrene copolymer resin having a weight average molecular weight of 60,000 to 250,000, comprising:
      a) 15 to 40 weight parts of conjugated diene rubber latex;
      b) 20 to 65 weight parts of methacrylate alkylester or acrylate alkylester compound grafted on the a) conjugated diene rubber latex;
      c) 8 to 25 weight parts of aromatic vinyl compound grafted on the a) conjugated diene rubber latex; and
      d) 5 to 20 weight parts of vinyl cyanide compound grafted on the a) conjugated diene rubber latex; and
   ii) 1 to 30 weight parts of polyester-amide copolymer
wherein the difference between the refractive index of the polyester-amide copolymer and that of the acrylonitrile-butadiene-styrene copolymer resin is 0.01 or less.

2. The acrylonitrile-butadiene-styrene copolymer transparent resin according to claim 1, wherein the a) conjugated diene rubber latex has particle diameter of 800 to 4,000 Å, gel contents of 60 to 95%, and swelling index of 12 to 40.

3. The acrylonitrile-butadiene-styrene copolymer transparent resin according to claim 1, wherein the b) methacrylate alkylester or acrylate alkylester compound is selected from a group consisting of methacrylate methylester, methacrylate ethylester, methacrylate propylester, methacrylate 2-ethylhexylester, methacrylate decylester and methacrylate laurylester.

4. The acrylonitrile-butadiene-styrene copolymer transparent resin according to claim 1, wherein the c) aromatic vinyl compound is selected from a group consisting of styrene, α-methylstyrene, p-methylstyrene, vinyltoluene and a mixture thereof.

5. The acrylonitrile-butadiene-styrene copolymer transparent resin according to claim 1, wherein a difference between refractive index of the a) conjugated diene rubber latex and that of a mixture of the b) methacrylate alkylester or acrylate alkylester compound, the c) aromatic vinyl compound and the d) vinyl cyanide compound is 0.005 or less.

6. A method for preparing acrylonitrile-butadiene-styrene copolymer transparent resin comprising the step of bulk-introducing or continuously introducing
   i) the step of preparing acrylonitrile-butadiene-styrene copolymer resin having weight average molecular weight of 60,000 to 250,000, bulk-introducing or continuously introducing
      a) to 15 to 40 weight parts of conjugated diene rubber latex,
      b) 20 to 65 weight parts of methacrylate alkylester or acrylate alkylester compound;
      c) 8 to 25 weight parts of aromatic vinyl compound; and
      d) 5 to 20 weight parts of vinylcyanide compound to graft-copolymerize them; and
   ii) the step of adding and blending 1 to 30 weight parts of polyester-amide copolymer on the basis of 100 weight parts of the acrylonitrile-butadiene-styrene copolymer resin
wherein a difference between the refractive index of the polyester-amide copolymer and that of the acrylonitrile-butadiene-styrene copolymer resin is 0.01 or less.

7. The method for preparing acrylonitrile-butadiene-styrene copolymer transparent resin according to claim 6, wherein a difference between refractive index of the a) conjugated diene rubber latex and that of a mixture of the b) methacrylate alkylester or acrylate alkylester compound, the c) aromatic vinyl compound and the d) vinyl cyanide compound is 0.005 or less.

* * * * *